US012159987B2

(12) United States Patent
Moon

(10) Patent No.: US 12,159,987 B2
(45) Date of Patent: Dec. 3, 2024

(54) ELECTRIC VEHICLE BATTERY PACK WITH SELECTABLE THERMAL REGULATION PATH

(71) Applicant: Polestar Performance AB, Gothenburg (SE)

(72) Inventor: Jongseok Moon, Gothenburg (SE)

(73) Assignee: POLESTAR PERFORMANCE AB, Gothenburg (SE)

( * ) Notice: Subject to any disclaimer, the term of this patent is extended or adjusted under 35 U.S.C. 154(b) by 496 days.

(21) Appl. No.: 17/672,428

(22) Filed: Feb. 15, 2022

(65) Prior Publication Data

US 2023/0261277 A1    Aug. 17, 2023

(51) Int. Cl.
*H01M 10/653* (2014.01)
*H01M 10/617* (2014.01)
*H01M 10/6563* (2014.01)
*H01M 50/505* (2021.01)

(52) U.S. Cl.
CPC ....... *H01M 10/653* (2015.04); *H01M 10/617* (2015.04); *H01M 10/6563* (2015.04); *H01M 50/505* (2021.01)

(58) Field of Classification Search
CPC ............. H01M 10/653; H01M 10/617; H01M 10/6563; H01M 50/505; H01M 10/058; H01M 10/60; H01M 10/625; H01M 10/655; H01M 50/209; H01M 2220/20; H01M 10/613; H01M 10/615; H01M 10/63; H01M 10/6554; H01M 10/658; Y02E 60/10

See application file for complete search history.

(56) References Cited

U.S. PATENT DOCUMENTS

2016/0272040 A1    9/2016  Cheng et al.
2020/0298663 A1    9/2020  Allgaeuer et al.

OTHER PUBLICATIONS

Application No. EP23156169.7, Extended European Search Report, Mailed On Jul. 11, 2023, 6 pages.

*Primary Examiner* — Kaity V Chandler
(74) *Attorney, Agent, or Firm* — Kilpatrick Townsend & Stockton LLP

(57) ABSTRACT

An electric vehicle battery pack with a selectable thermal regulation path, including a plurality of battery cells, and a thermally regulated member movably coupled to the plurality of battery cells, wherein the thermally regulated member is configured to move between a contact position in which the thermally regulated member is in contact with at least a portion of the plurality of battery cells, and an isolation position, in which the thermally regulated member is spaced apart from the plurality of battery cells.

20 Claims, 4 Drawing Sheets

ELECTRIC VEHICLE BATTERY PACK WITH SELECTABLE THERMAL REGULATION PATH

TECHNICAL FIELD

The present disclosure relates generally to battery conditioning of an electric vehicle, and more particularly to a selectable thermal regulation path system and method configured to enable a distance between a thermally regulated member and individual battery cells within a battery pack to be regulated, thereby enabling the battery pack to be thermally isolated when uncoupled from the thermally regulated member and thermally conditioned (e.g., heated or cooled) when coupled to the thermally regulated member.

BACKGROUND

Electric vehicles are becoming increasingly popular as consumers look to decrease their environmental impact and improve air quality. Instead of a traditional internal combustion engine, electric vehicles include one or more motors, powered by a rechargeable battery pack. A common battery pack is made up of one or more battery modules, each module containing a plurality of battery cells, which act as galvanic cells when being discharged by converting chemical energy to electrical energy, and electrolytic cells when being recharged by converting electrical energy to chemical energy.

As is well known, these battery cells can generate heat in use, thus reducing the range of the electric vehicle and the durability and overall life of the battery cells making up the rechargeable battery pack. In rare cases, a single battery cell can overheat, which can then propagate to the other battery cells and greatly reduce the longevity or the ability of the remaining cells to hold charge for an extended period of time.

Conversely, relatively low temperatures within the battery pack, for example as a result of the vehicle being exposed to low ambient environmental conditions for an extended period of time, can also result in degradation in performance of the battery cells. In particular, low battery temperatures can result in a decrease in output and a decrease in recharging capacity, which can adversely affect the driving range of the vehicle.

The present disclosure addresses these concerns.

SUMMARY OF THE DISCLOSURE

Embodiments of the present disclosure provide an electric vehicle battery pack including a thermally regulated member that is selectively coupleable to the battery pack, thereby enabling the battery pack to be actively heated or cooled when coupled (e.g., in physical contact) with the thermally regulated member, and enabling the battery pack to be isolated from the thermally regulated member during other times of operation. For example, in some embodiments, the thermally regulated member can represent a heating or cooling plate movable relative to the battery pack to affect the desired amount or intensity of active heating or cooling applied to the battery pack.

One embodiment of the present disclosure provides an electric vehicle battery pack with a selectable thermal regulation path, the electric vehicle battery pack including a plurality of battery cells, and a thermally regulated member movably coupled to the plurality of battery cells, wherein the thermally regulated member is configured to move between a contact position in which the thermally regulated member is in contact with at least a portion of the plurality of battery cells, and an isolation position, in which the thermally regulated member is spaced apart from the plurality of battery cells.

In one embodiment, the thermally regulated member is further configured to selectively contact at least a portion of a battery busbar to affect a transfer of thermal energy between the battery busbar and the thermally regulated member. In one embodiment, movement of the thermally regulated member is configured to maintain the plurality of battery cells in a temperature range of between about 40° C. and about 45° C. In one embodiment, the plurality of battery cells and thermally regulated member are contained within a housing.

In one embodiment, a distance between the thermally regulated member and the plurality of battery cells is controlled by a drive mechanism. In one embodiment, the thermally regulated member is operably coupled to the plurality of battery cells via a plurality of linkages configured to enable the thermally regulated member to move between the contact position and the isolation position. In one embodiment, the thermally regulated member comprises a plurality of contact pads adapted to transfer thermal energy between the thermally regulated member and the plurality of battery cells. In one embodiment, the thermally regulated member defines one or more conduits through which a thermally regulated medium can flow to affect at least one of heating or cooling of the thermally regulated member.

In one embodiment, the electric vehicle battery pack further includes a thermal isolation fan configured to force air through a space defined between the thermally regulated member and the plurality of cells. In one embodiment, the electric vehicle battery pack further includes at least one sensor configured to monitor a temperature of at least one of the plurality of battery cells. In one embodiment, the electric vehicle battery pack further includes an electronic control unit communicatively coupling the at least one sensor to the drive mechanism.

Another embodiment of the present disclosure provides an electric vehicle comprising the electric vehicle battery pack according to any embodiment of the disclosure.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which.

Figure 1:
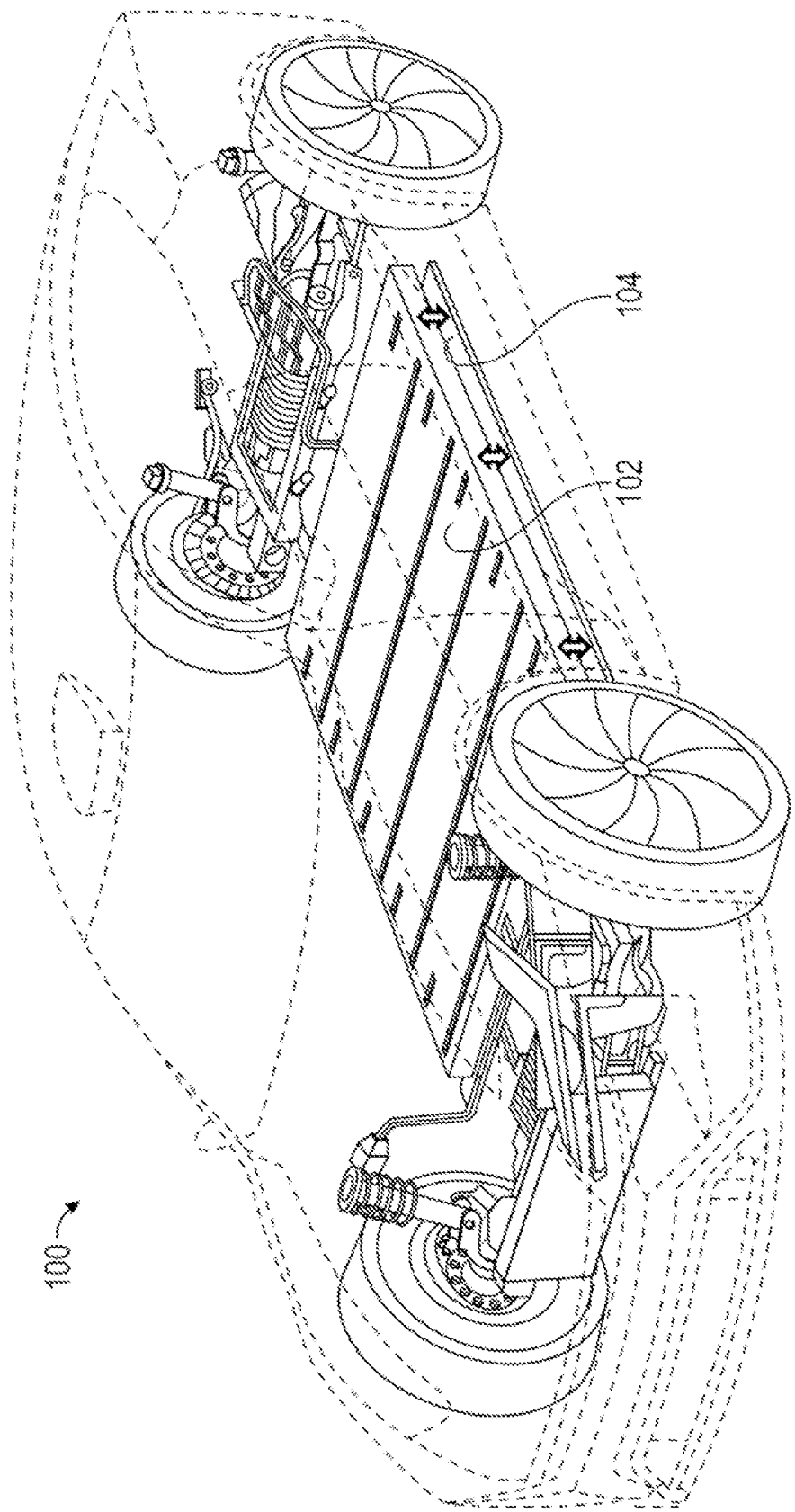
FIG. 1 is a perspective view depicting an electric vehicle including a selectable heat path thermal regulation member, in accordance with an embodiment of the disclosure.

While embodiments of the disclosure are amenable to various modifications and alternative forms, specifics thereof shown by way of example in the drawings will be described in detail. It should be understood, however, that the intention is not to limit the disclosure to the particular embodiments described. On the contrary, the intention is to cover all modifications, equivalents, and alternatives falling within the spirit and scope of the subject matter as defined by the claims.

DETAILED DESCRIPTION

Referring to FIG. 1, an electric vehicle 100 comprising a battery pack 102 including a selectable heat path thermal regulation member 104 is depicted in accordance with an embodiment of the disclosure. In embodiments, the thermal regulation member 104 can be pivoted, shifted, or otherwise moved relative to the battery pack 102, so as to selectively enable direct contact between the thermal regulation member 104 and a battery pack 102 when a maximum heating or cooling transfer between the thermal regulation member 104 and the battery pack 102 is desired, and to selectively enable a variable gap distance between the thermal regulation member 104 and the battery pack 102 when less thermal transfer between the thermal regulation member 104 and the battery pack 102 is desired.

As depicted, in some embodiments, the battery pack 102 can represent a sealed battery cell compartment containing clusters of individual battery cells (sometimes referred to as "battery modules") and other battery related components. The assembled battery pack 102 can be mounted to the frame or chassis of the vehicle 100 and in some embodiments can be positioned adjacent to a cabin floor of the vehicle 100, thereby maintaining a low center of gravity. For example, the battery pack 102 may be positioned below the passenger compartment, which is generally considered an ideal location as the battery pack 102 maintains a low center of gravity of the vehicle 100, and is spaced away from the outer body of the vehicle, and therefore less prone to being damaged in a collision.

Various embodiments of the present disclosure will be described in detail with reference to the drawings, wherein like reference numerals represent like parts and assemblies throughout the several views. Various directions and orientations, such as "upward," "downward," "top," "bottom," "upper," "lower", etc. are generally described herein with reference to the drawings in the usual gravitational frame of reference, regardless of how the components may be oriented.

Additionally, the terms "battery," "cell," and "battery cell" may be used interchangeably and may refer to any of a variety of different cell types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configurations. The term "battery pack" as used herein refers to multiple individual batteries contained within a single piece or multi-piece housing, the individual batteries electrically interconnected to achieve the desired voltage and capacity for a particular application. The term "electric vehicle" as used herein may refer to an all-electric vehicle, also referred to as an EV, a plug-in hybrid vehicle, also referred to as a PHEV, or a hybrid vehicle, also referred to as a HEV, where a hybrid vehicle refers to a vehicle utilizing multiple propulsion sources one of which is an electric drive system.

Figure 2:
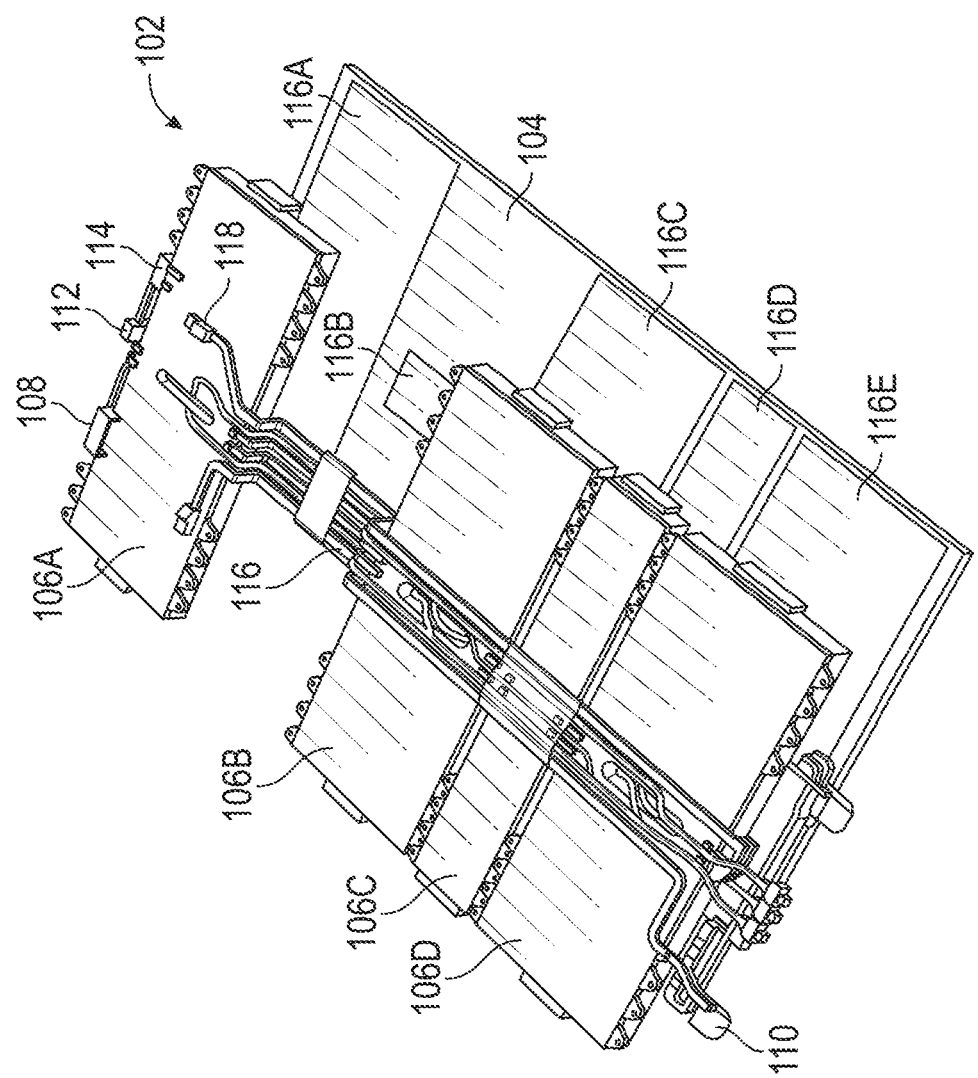
FIG. 2 is an exploded perspective view depicting an electric vehicle battery pack including a selectable heat path thermal regulation member, in accordance with an embodiment of the disclosure.

With additional reference to FIG. 2, a perspective view of an electric vehicle battery pack 102 comprising a selectable heat path thermal regulation member 104 is depicted in accordance with an embodiment of the disclosure. As depicted, in some embodiments, individual battery cells within the battery pack 102 can be grouped into distinct clusters 106A-D (sometimes referred to as "battery modules"). In addition to the battery modules 106A-D, the battery pack 102 can comprise a number of other electrical components, including an electrical current transmission system 108, safety system 110, battery management system 112, current management system 114, and a battery busbar 116 interconnecting the various components 106A-F, 108, 110, 112, and 114.

Figure 3:
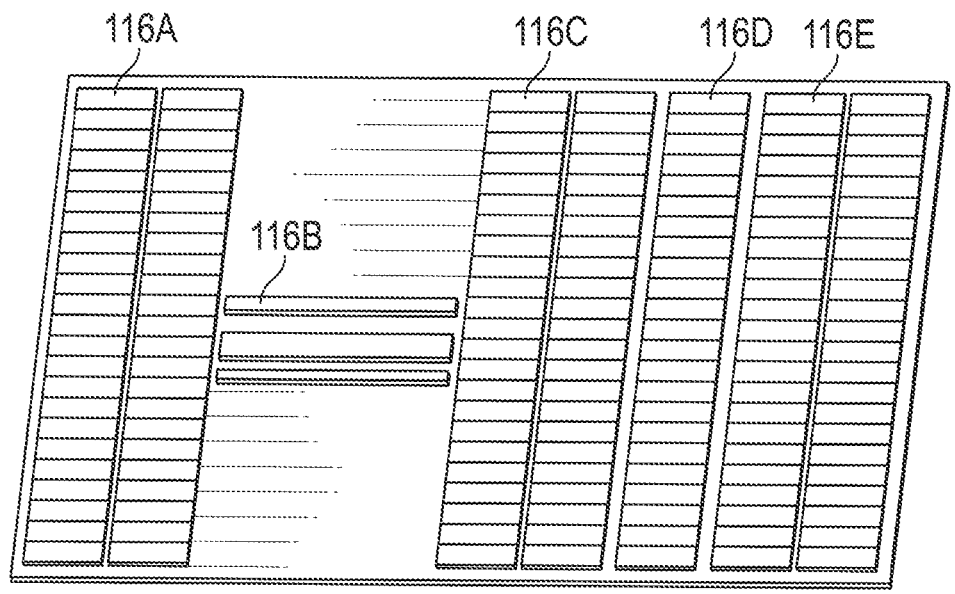
FIG. 3 is a perspective view depicting a thermal regulation member, in accordance with an embodiment of the disclosure.
Figure 4A:
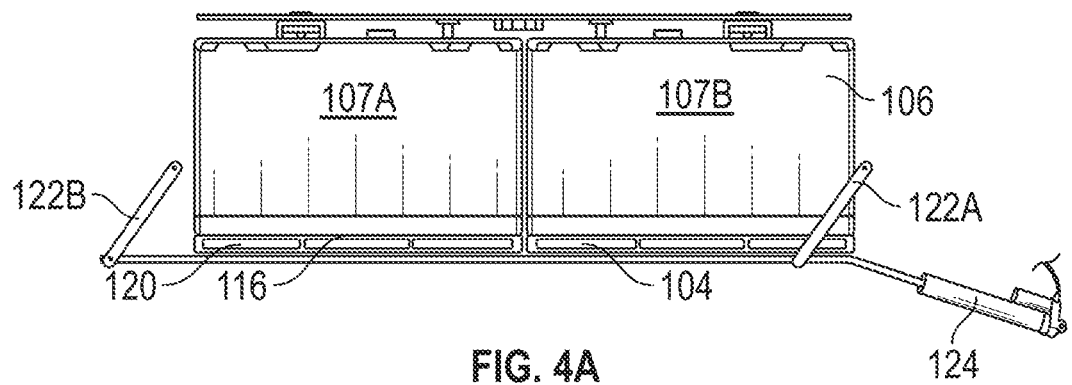
FIG. 4A is a partial cross sectional view depicting a battery module and thermal regulation unit, wherein the thermal regulation unit is in a contact position relative to the battery module, in accordance with an embodiment of the disclosure.
Figure 4B:
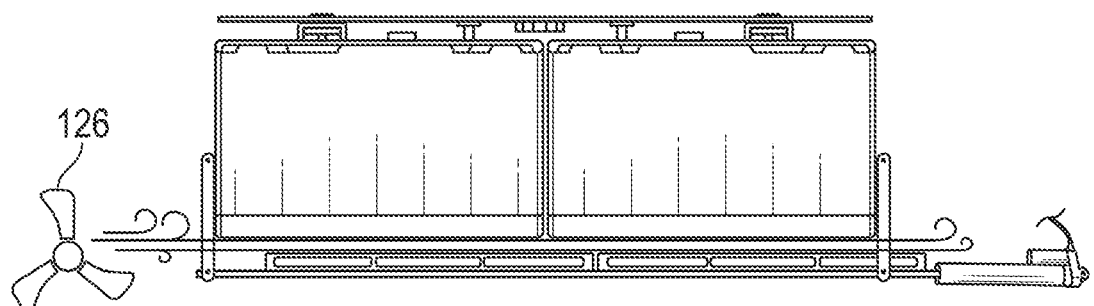
FIG. 4B is a partial cross sectional view depicting a battery module and thermal regulation unit, wherein the thermal regulation unit is in an isolation position relative to the battery module, in accordance with an embodiment of the disclosure.

The thermal regulation member 104 can be configured as an actively heated or cooled panel, which can be moved in relative proximity or distance to the battery modules 106A-D to affect a desired degree of heating or cooling. With additional reference to FIG. 3, for improved efficiency, rather than actively heating or cooling an entire surface of the thermal regulation member 104, in some embodiments, the thermal regulation member 104 can include a plurality of contact pads 116A-E configured to selectively contact portions of the battery modules 106A-D and battery busbar 116. To affect active heating or cooling, in some embodiments, the thermal regulation member 104 can define one or more conduits 120 (as depicted in FIGS. 4A-B) to which a thermal regulation fluid or medium can flow. In some embodiments, the thermal regulation member 104 can be positioned adjacent to a bottom surface of the battery modules 106A/D, potentially concurrent with (e.g., in addition to) an existing battery thermal regulation panel. Other configurations of the thermal regulation member 104 are also contemplated.

In some embodiments, the battery pack 102 can include a rigid outer shell, representing a bottom and one or more sides of a structural vessel defining a compartment into which the thermal regulation member 104 is positioned. Further, in embodiments, the outer shell can include one or more structural supports, such as cross members, which can provide structural support to the battery pack 102, as well as surfaces within the compartment on which other components of the battery pack can be affixed. A variety of components can be packed into the compartment 108 before a cover is affixed to a top surface of the battery tray 106, thereby sealing the compartment. In embodiments including an outer shell, the outer shell can define one or more selectively sealable vents or ports enabling a flow of air to pass through at least a portion of the battery pack (e.g., through a space defined between the battery cells or modules 106A-D and the thermal regulation member 104).

With continued reference to FIG. 2, in some embodiments, the battery management system 112 or other components of the multi-cell battery pack can include one or more sensors 118 for monitoring a physical state of the individual cells during operation. Such sensors 118 include, but are not limited to measurement of temperature, pressure, voltage, amperage, and other ambient conditions (e.g., the presence of smoke or fumes, the presence of liquid, etc.) within the battery pack 102. Data from the sensors 118 can be used by hardware and software to make intelligent decisions to control a characteristic of the individual cells, so that the characteristic within any individual cell stays within an acceptable operating range. Additionally, the battery management system 122, sometimes in combination with other systems (e.g., electrical current transmission system 108, safety system 110, or battery management system 112) can be configured to enable information gathered by the one or more sensors 118 to flow into and out of the battery pack 102. In some embodiments, the battery management system 112 can include mixed signal integrated circuits that incorporate both analog and digital circuits, such as one or more types of digital memory and special registers to hold battery data.

During vehicle operation the individual battery cells discharge energy as galvanic cells by converting chemical energy to electrical energy (e.g., for use by the electric motor). During high rates of discharge (e.g., when the vehicle is under heavy acceleration and/or driving up a hill, etc.), the individual cells can generate a significant amount of heat. The heat produced by a high rate of discharge within an individual cell is generally a function of an electrical current and an internal electrical resistance of the cell. The cells are generally more sensitive to high temperatures when a voltage within the cell is relatively high. This volatility is dependent upon cell chemistry (e.g., lithium-ion reaction, etc.) and varies among different types of cells contemplated for use.

It has been observed that optimal battery cell performance is more likely to occur within a desired temperature range (e.g., 40-45° C., etc.), with a maximum/not to exceed temperature (e.g., 60° C.) being above the desired temperature range. In rare cases, individual battery cells within a battery pack 102 can exhibit thermal characteristics above a desired temperature range (e.g., above the maximum/not to exceed temperature), which may result in a failure (e.g., thermal runaway, etc.) of the individual cell. During such an occurrence, heat energy from the cell exhibiting the thermal characteristics can propagate into nearby and adjacent cells, thereby creating the potential for a chain reaction thermal event across multiple battery cells. For example, self-ignition of a battery cell may occur when the temperature of the cell reaches a temperature in a range of between about 120° C. and about 150° C.

Conversely, recent studies have indicated that operating an electric vehicle 100 in cold ambient weather conditions can result in a decrease in performance in available range. In particular, some studies suggest that a particular vehicle's range during the colder winter months may be about 60% of a typical expected range during the warmer summer months. Accordingly, it has been observed that optimal battery cell performance is most likely to occur within the desired temperature range (e.g., 40-45° C., etc.), with a decrease in performance observed below the lower end of the range.

For improved thermal regulation, embodiments of the present disclosure provide a battery pack 102 including a selectable heat path thermal regulation member 104, in which a distance between the thermal regulation member 104 and the battery modules 106A-D (and other battery components) is adjustable to affect the desired degree of heating or cooling. For example, with reference to FIGS. 4A-B, partial cross sectional views of a battery module 106 (including battery cells 107A-B) and a movable thermal regulation member 104, are depicted in accordance with an embodiment of the disclosure.

For example, in some embodiments, the thermal regulation member 104 can be operably coupled to the battery module 106 via one or more linkages 122A/B, thereby enabling the thermal regulation member 104 to shift in proximity relative to the battery module 106. Accordingly, in some embodiments, the battery module 106 can shift between the contact position (as depicted in FIG. 4A) in which at least a portion of the thermal regulation member 104 (e.g., contact pads 116A-E, etc.) is placed in physical contact with the battery module 106 to affect maximum thermal transfer between the thermal regulation member 104 and a battery module 106, and an isolation position (as depicted in FIG. 4B) in which the thermal regulation member 104 can be spaced apart from the battery module 106, such that an insulating buffer or gap of a defined width isolates the battery module 106 from the thermal regulation member 104. In some embodiments, movement of the thermal regulation member 104 relative to the battery module can be affected by an actuator 124 or other drive mechanism. Accordingly, depending upon the thermal regulation needs of the battery pack 102, the distance or insulation gap between the thermal regulation member 104 and the battery module 106 can be adjusted along the spectrum between the contact position and the isolation position.

In some embodiments, the thermal regulation member 104 can define one or more conduits 120 through which a thermally regulated medium or fluid can flow. Accordingly, in some embodiments, a refrigerant can pass through the conduit 120 to affect cooling of the thermal regulation member. In other embodiments, hot or warm liquids can pass through the conduit 120 to affect heating of the thermal regulation member 104. For improved efficiency, rather than heating or cooling the entire exterior of the thermal regulation member 104, in some embodiments, the thermal regulation member 104 can include one or more contact pads 116A-E (also depicted in FIG. 3) configured to correspond with one or more thermal transfer surfaces of the battery module 106, battery busbar 116 or other components of the battery pack 102, particularly when the thermal regulation member 104 is in the contact position relative to the battery module 106.

In the isolation position (e.g., when the thermal regulation member 104 is positioned at its maximum distance away from the battery module 106) an insulating gap of a defined width can be created between the thermal regulation member 104 and the battery module 106. To inhibit heat transfer between the thermal regulation member 104 and the battery module 106, in some embodiments, a flow of gas can be directed through the insulating gap defined between the thermal regulation member 104 and the battery module 106. For example, in some embodiments, forced air (e.g., via fan 126) can be directed through the space between the battery module 106 and the thermal regulation member 104.

Figure 5:
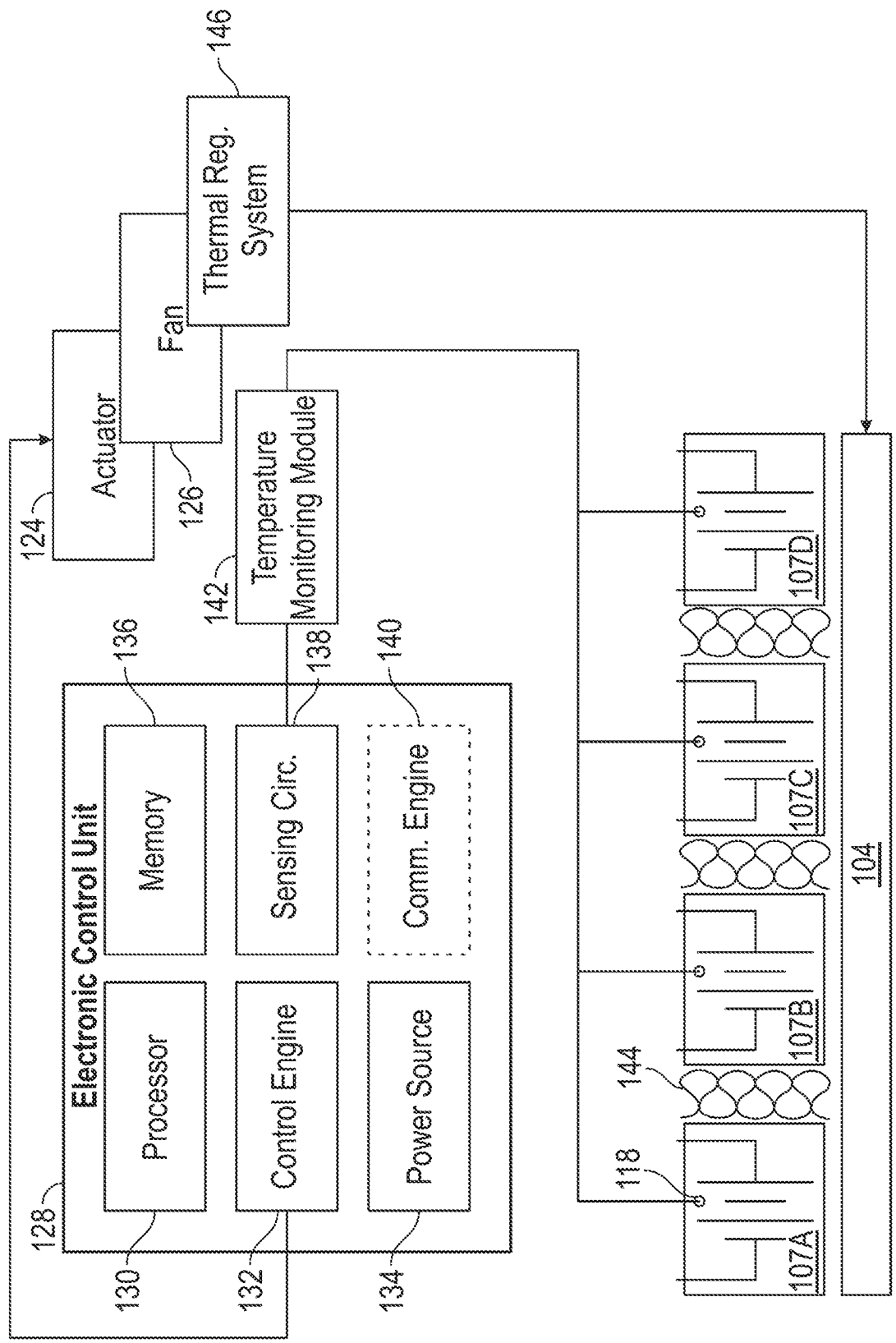
FIG. 5 is a block diagram depicting a battery thermal regulation system having a thermal regulation member with a selectable thermal conduction path, in accordance with an embodiment of the disclosure.

With additional reference to FIG. 5, a block diagram depicting a battery conditioning system 150 having a thermal regulation member 104 with a selectable thermal conduction path, is depicted in accordance with an embodiment of the disclosure. As depicted, in addition to the thermal regulation member 104 and battery modules 106, the battery conditioning system 150 can include an electronic control unit (ECU) 128 configured to control a separation between the thermal regulation member 104 and the battery modules 106.

The ECU 128 or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application specific integrated circuit (ASIC) or field programmable gate array (FPGA), for example, or as a combination of hardware and software, such as by a microprocessor system and a set of program instructions that adapt the engine to implement the particular functionality, which (while being executed) transform the microprocessor system into a special-purpose device.

An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques.

Accordingly, each engine can be realized in a variety of physically realizable configurations, and should generally not be limited to any particular implementation exemplified herein, unless such limitations are expressly called out. In addition, an engine can itself be composed of more than one sub-engine, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

In some embodiments, ECU 128 can include a processor 130, memory 136, control engine 132, sensing circuitry 138, and power source 134. Optionally, in embodiments, ECU 128 can further include a communications engine 140. Processor 130 can include fixed function circuitry and/or programmable processing circuitry. Processor 130 can include any one or more of a microprocessor, a controller, a DSP, an ASIC, an FPGA, or equivalent discrete or analog logic circuitry. In some examples, processor 130 can include multiple components, such as any combination of one or more microprocessors, one or more controllers, one or more DSPs, one or more ASICs, or one or more FPGAs, as well as other discrete or integrated logic circuitry. The functions attributed to processor 130 herein may be embodied as software, firmware, hardware or any combination thereof.

Memory 136 can include computer-readable instructions that, when executed by processor 130 cause ECU 128 to perform various functions. Memory 136 can include volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media.

Control engine 132 can include instructions to control the components of ECU 128 and instructions to selectively control actuation of the actuator 124, fan 126 and regulation of a thermal regulation system 146 to control a temperature of the thermal regulation member 104. For example, based on conditions detected by the sensing circuitry 138 or the vehicle (e.g. other vehicle ECUs), control engine 132 can selectively activate one or more logic sequences (e.g., stored in the control engine 132 or memory 136) to raise/lower or otherwise control the separation distance between the thermal regulation member 104 and cells 107A-D to affect the transfer of thermal energy between the between the thermal regulation member 104 and cells 107A-D.

In embodiments, sensing circuitry 138 can be configured to sense a variety of conditions related to each of the cells 107A-D. For example, sensing circuitry 138 can be configured to sense at least one of a temperature, pressure, voltage, amperage, or other ambient condition (e.g., the presence of smoke or fumes, the presence of liquid, etc.) directly or indirectly associated with each cell 107A-D. Accordingly, sensing circuitry 138 can include or can be operable with one or more sensors 118 (e.g., one or more thermocouples, pressure sensors, etc.).

If it is verified by the processor 130 that a temperature of at least one of the cells 107A-D has risen above the desired temperature range, the control engine 132 can control the actuator 124 to move the thermal regulation member 104 into contact with the cells 107A-D, thereby providing a cooling effect to the cells 107A-D. As the cells 107A-D are cooled, the processor 130 can control the actuator 124 to slowly move the thermal regulation member 104 out of contact with the cells 107A-D, and if needed activate the fan 126 to further isolate the thermal regulation member 104 from the cells 107A-D.

Alternatively, where the thermal regulation member 104 is used to preheat or warm the cells 107A-D, if it is sensed by the sensing circuitry 138 that the battery cells 107A-D are below a desired temperature range, the control engine 132 can control the actuator 124 to move the thermal regulation member 104 into contact with the cells 107A-D, thereby providing a warning effect to the cells 107A-D. As a temperature of the cells 107A-D is raised, the processor 130 can control the actuator 124 to slowly move the thermal regulation member 104 out of contact with the cells 107A-D, and if needed activate the fan 126 to further isolate the thermal regulation member 104 from the cells 107A-D. In some embodiments, temperature control can also be afforded via one or more high temperature barricades 144. In some embodiments, these high temperature barricades 144 can be in the form of insulation constructed of a material configured to provide a physical heat barrier to inhibit heat propagation between adjacent cells 107A-D within the multi-cell battery pack 102.

Power source 134 is configured to deliver operating power to the components of ECU 128. Power source 134 can include a battery and a power generation circuit to produce the operating power (e.g., individual battery cells 140, etc.). In some examples, the power source 134 is rechargeable to allow extended operation. Power source 134 can include any one or more of a plurality of different battery types, such as nickel cadmium batteries, lithium ion batteries and the like.

Optionally, communications engine 140 can include any suitable hardware, firmware, software, or any combination thereof for communicating with other components of the vehicle and/or external devices (e.g., charging station, etc.). Under the control of processor 130, communication engine 140 can receive downlink telemetry from, as well as send uplink telemetry to one or more external devices using an internal or external antenna. In addition, communication engine 140 can facilitate communication with a networked computing device and/or a computer network. For example, in some embodiments, the communications engine 140 can be configured to receive information to anticipate energy usage and discharge requirements along the desired route, thereby comparison of actual, sensed conditions of the individual cells 107A-D to expected conditions of the individual cells for a given environmental temperature along the desired travel route.

The invention is further illustrated by the following embodiments:

An electric vehicle battery pack with a selectable thermal regulation path, the electric vehicle battery pack comprising: a plurality of battery cells; and a thermally regulated member movably coupled to the plurality of battery cells, wherein the thermally regulated member is configured to move between a contact position in which the thermally regulated member is in contact with at least a portion of the plurality of battery cells, and an isolation position, in which the thermally regulated member is spaced apart from the plurality of battery cells.

A system or method according to any embodiment, wherein the thermally regulated member is further configured to selectively contact at least a portion of a battery busbar to affect a transfer of thermal energy between the battery busbar and the thermally regulated member.

A system or method according to any embodiment, wherein movement of the thermally regulated member is configured to maintain the plurality of battery cells in a temperature range of between about 40° C. and about 45° C.

A system or method according to any embodiment, wherein the plurality of battery cells and thermally regulated member are contained within a housing.

A system or method according to any embodiment, wherein a distance between the thermally regulated member and the plurality of battery cells is controlled by a drive mechanism.

A system or method according to any embodiment, wherein the thermally regulated member is operably coupled to the plurality of battery cells via a plurality of linkages configured to enable the thermally regulated member to move between the contact position and the isolation position.

A system or method according to any embodiment, wherein the thermally regulated member comprises a plurality of contact pads adapted to transfer thermal energy between the thermally regulated member and the plurality of battery cells.

A system or method according to any embodiment, wherein the thermally regulated member defines one or more conduits through which a thermally regulated medium can flow to affect at least one of heating or cooling of the thermally regulated member.

A system or method according to any embodiment, further comprising a thermal isolation fan configured to force air through a space defined between the thermally regulated member and the plurality of cells.

A system or method according to any embodiment, further comprising at least one sensor configured monitor a temperature of at least one of the plurality of battery cells.

A system or method according to any embodiment, further comprising an electronic control unit communicatively coupling the at least one sensor to the drive mechanism.

An electric vehicle comprising the electric vehicle battery pack according to any embodiment of the disclosure.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112 (f) are not to be invoked unless the specific terms "means for" or "step for" are recited in a claim.

What is claimed is:

1. An electric vehicle battery pack with a selectable thermal regulation path, the electric vehicle battery pack comprising:
   a plurality of battery cells; and
   a thermally regulated member movably coupled to the plurality of battery cells, wherein the thermally regulated member is configured to move between a contact position in which the thermally regulated member is in contact with at least a portion of the plurality of battery cells, and an isolation position, in which the thermally regulated member is spaced apart from the plurality of battery cells.

2. The electric vehicle battery pack of claim 1, wherein the thermally regulated member is further configured to selectively contact at least a portion of a battery busbar to affect a transfer of thermal energy between the battery busbar and the thermally regulated member.

3. The electric vehicle battery pack of claim 2, wherein movement of the thermally regulated member is configured to maintain the plurality of battery cells in a temperature range of between about 40° C. and about 45° C.

4. The electric vehicle battery pack of claim 1, wherein the plurality of battery cells and thermally regulated member are contained within a housing.

5. The electric vehicle battery pack of claim 1, wherein a distance between the thermally regulated member and the plurality of battery cells is controlled by a drive mechanism.

6. The electric vehicle battery pack of claim 1, wherein the thermally regulated member is operably coupled to the plurality of battery cells via a plurality of linkages configured to enable the thermally regulated member to move between the contact position and the isolation position.

7. The electric vehicle battery pack of claim 1, wherein the thermally regulated member comprises a plurality of contact pads adapted to transfer thermal energy between the thermally regulated member and the plurality of battery cells.

8. The electric vehicle battery pack of claim 1, wherein the thermally regulated member defines one or more conduits through which a thermally regulated medium can flow to affect at least one of heating or cooling of the thermally regulated member.

9. The electric vehicle battery pack of claim 1, further comprising a thermal isolation fan configured to force air through a space defined between the thermally regulated member and the plurality of cells.

10. An electric vehicle battery thermal regulation system comprising:
- a plurality of battery cells; and
- a thermally regulated member movably coupled to the plurality of battery cells, wherein a distance between the thermally regulated member and the plurality of battery cells is controlled by a drive mechanism;
- at least one sensor configured monitor a temperature of at least one of the plurality of battery cells; and
- an electronic control unit communicatively coupling the at least one sensor to the drive mechanism, wherein the thermally regulated member is configured to move between a contact position in which the thermally regulated member is in contact with at least a portion of the plurality of battery cells, and an isolation position, in which the thermally regulated member is spaced apart from the plurality of battery cells.

11. The electric vehicle battery thermal regulation system of claim 10, wherein the thermally regulated member is further configured to selectively contact at least a portion of a battery busbar to affect a transfer of thermal energy between the battery busbar and the thermally regulated member.

12. The electric vehicle battery thermal regulation system of claim 11, wherein movement of the thermally regulated member is configured to maintain the plurality of battery cells in a temperature range of between about 40° C. and about 45° C.

13. The electric vehicle battery thermal regulation system of claim 10, wherein the plurality of battery cells and thermally regulated member are contained within a housing.

14. The electric vehicle battery thermal regulation system of claim 10, wherein the thermally regulated member is operably coupled to the plurality of battery cells via a plurality of linkages configured to enable the thermally regulated member to move between the contact position and the isolation position.

15. The electric vehicle battery thermal regulation system of claim 10, wherein the thermally regulated member comprises a plurality of contact pads adapted to transfer thermal energy between the thermally regulated member and the plurality of battery cells.

16. The electric vehicle battery thermal regulation system of claim 10, wherein the thermally regulated member defines one or more conduits through which a thermally regulated medium can flow to affect at least one of heating or cooling of the thermally regulated member.

17. The electric vehicle battery thermal regulation system of claim 10, further comprising a thermal isolation fan configured to force air through a space defined between the thermally regulated member and the plurality of cells.

18. An electric vehicle comprising:
- a vehicle frame;
- a plurality of battery cells operably coupled to the vehicle frame; and
- a thermally regulated member movably coupled to the plurality of battery cells, wherein the thermally regulated member is configured to move between a contact position in which the thermally regulated member is in contact with at least a portion of the plurality of battery cells, and an isolation position, in which the thermally regulated member is spaced apart from the plurality of battery cells.

19. The electric vehicle of claim 18, wherein the thermally regulated member is further configured to selectively contact at least a portion of a battery busbar to affect a transfer of thermal energy between the battery busbar and the thermally regulated member.

20. The electric vehicle of claim 19, wherein movement of the thermally regulated member is configured to maintain the plurality of battery cells in a temperature range of between about 40° C. and about 45° C.

* * * * *